(12) United States Patent  
Abraham et al.

(10) Patent No.: US 8,463,987 B2  
(45) Date of Patent: Jun. 11, 2013

(54) SCALABLE SCHEDULERS FOR MEMORY CONTROLLERS

(75) Inventors: Philip Abraham, Hillsboro, OR (US); Stanley S. Kulick, Portland, OR (US); Randy B Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1013 days.

(21) Appl. No.: 12/236,453

(22) Filed: Sep. 23, 2008

(65) Prior Publication Data

US 2010/0077140 A1  Mar. 25, 2010

(51) Int. Cl.
*G06F 12/00* (2006.01)

(52) U.S. Cl.
USPC ..... 711/105; 711/106; 711/154; 711/E12.001

(58) Field of Classification Search
USPC ............................ 711/105, 106, 154, E12.001
See application file for complete search history.

(56) References Cited

U.S. PATENT DOCUMENTS

| 5,239,639 | A * | 8/1993 | Fischer et al. | 713/600 |
| 2005/0204094 | A1* | 9/2005 | Rotithor et al. | 711/167 |
| 2008/0162855 | A1* | 7/2008 | Thomas | 711/167 |
| 2009/0138670 | A1* | 5/2009 | Mutlu et al. | 711/167 |
| 2010/0020887 | A1* | 1/2010 | Demas et al. | 375/240.28 |

\* cited by examiner

*Primary Examiner* — Midys Rojas
(74) *Attorney, Agent, or Firm* — Caven & Aghevli LLC

(57) ABSTRACT

Methods and apparatus to improve throughput and efficiency in memory devices are described. In one embodiment, a memory controller may include scheduler logic to issue read or write requests to a memory device in an optimal fashion, e.g., to maximize bandwidth and/or reduce latency. Other embodiments are also disclosed and claimed.

20 Claims, 6 Drawing Sheets

SCALABLE SCHEDULERS FOR MEMORY CONTROLLERS

FIELD

The present disclosure generally relates to the field of electronics. More particularly, some embodiments of the invention generally relate to scalable schedulers for memory controllers.

BACKGROUND

As processors increase their processing capabilities, one concern is the speed at which a main memory may be accessed by a processor. For example, to process data, a processor may need to first fetch data from a main memory. After completion of the processing, the results may need to be stored in the main memory. To improve performance, some processors may have access to a cache that temporarily stores the data. However, cache sizes are generally much smaller than a main memory. Thus, speed and efficiency of an interface between a processor and a main memory may be a critical factor in overall computing performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

In some embodiments, a memory controller may include scheduler logic to issue read or write requests to DRAM in an optimal fashion, e.g., to maximize bandwidth and/or reduce latency. In various embodiments, the scheduler logic may be integrated in a processor, integrated in a chipset, or otherwise coupled to one or more processors directly or via one or more interconnects or busses, such as those discussed with reference to FIGS. 1-6.

Generally, a memory controller may have a wide range of target markets, such as markets ranging from servers to mobile devices. These markets have differing requirements for memory technology (such as DDR3 (Double Data Rate 3), FBD (Fully Buffered Dual In-line Memory Module (DIMMs), etc.), number of DIMMS supported per channel, number of channels, etc. To address these issues, in an embodiment, a memory scheduler may include various components that allow the scheduler to operate on a clock that is independent of the clock used for storage components of a memory device (e.g., DRAM storage units). Clock crossing logic may be used to transfer the DDR commands to the frequency domain associated with the scheduler.

Figure 1:
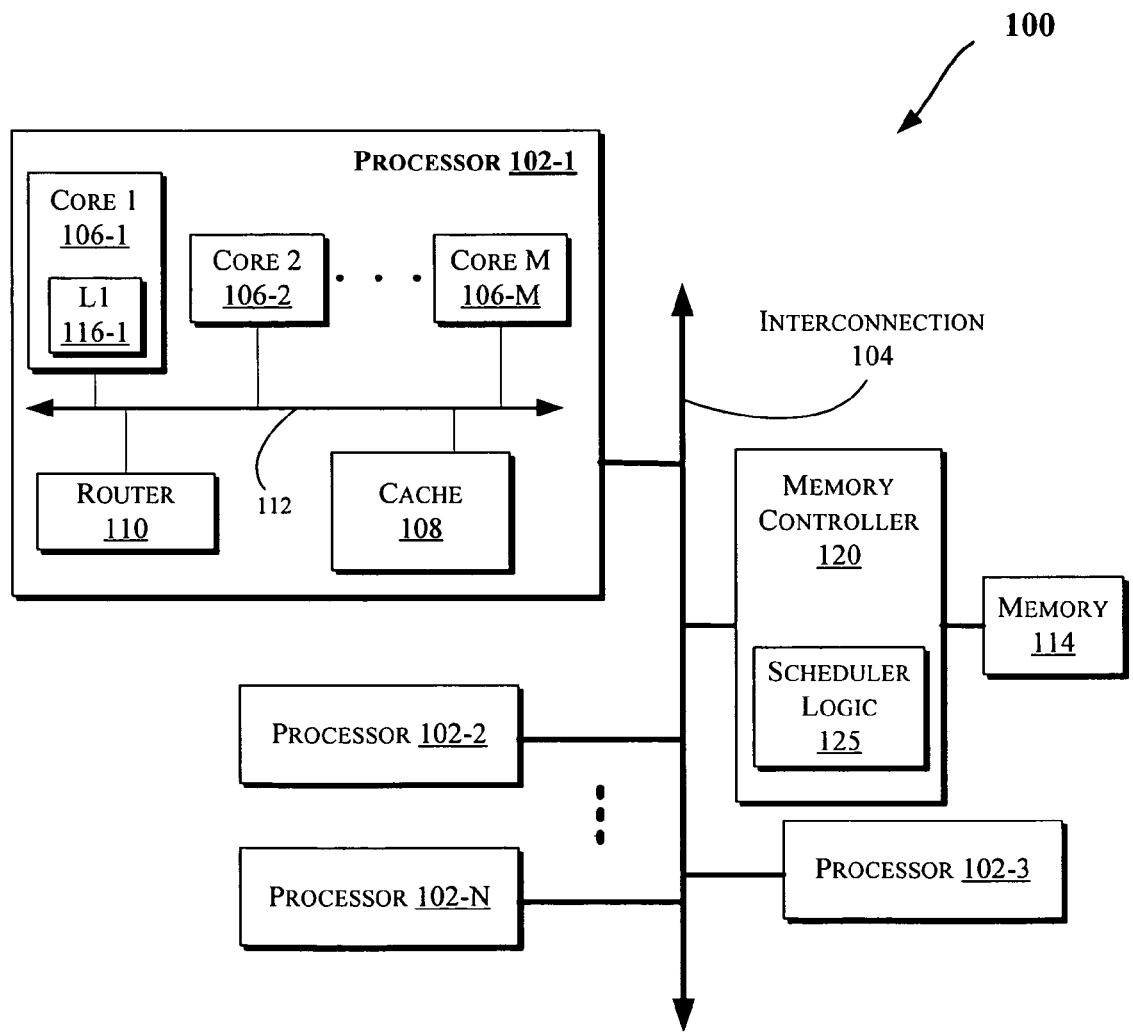
FIGS. 1, 5, and 6 illustrate block diagrams of embodiments of computing systems, which may be utilized to implement various embodiments discussed herein.

Moreover, schedulers discussed herein may be provided in various computing systems, such as those discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Even though the memory controller 120 is shown to be coupled between the interconnection 102 and the memory 114, the memory controller 120 may be located elsewhere in system 100. For example, memory controller 120 may be provided within one of the processors 102 in some embodiments. Also, in some embodiments, system 100 may include logic (e.g., scheduler logic 125) to issue read or write requests to the memory 114 in an optimal fashion, e.g., to maximize bandwidth and/or reduce latency, as will be further discussed herein, e.g., with reference to FIGS. 3 and 4.

Figure 2:
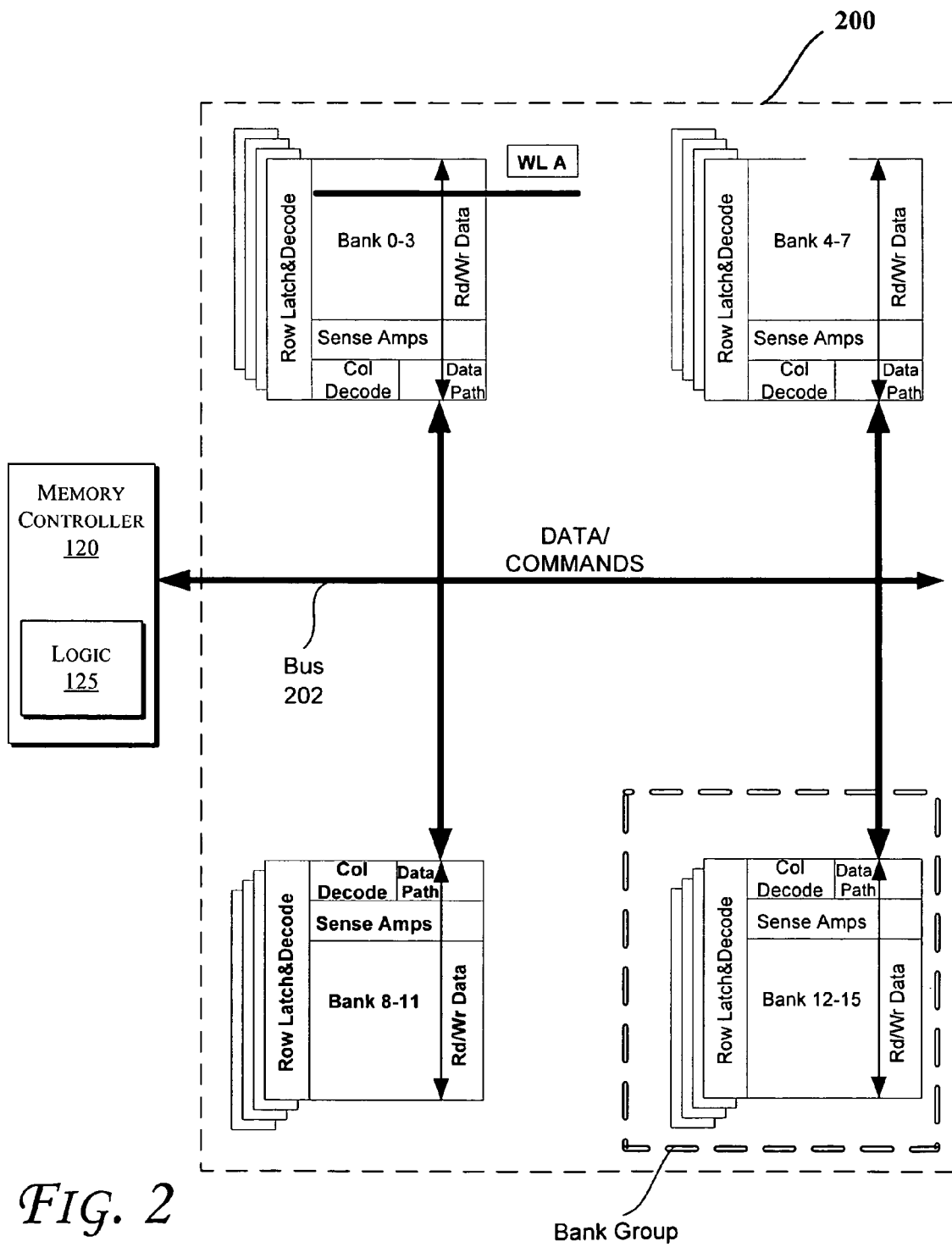
FIG. 2 illustrates a block diagram of a Dynamic Random Access Memory (DRAM), which may be utilized to implement various embodiments.

FIG. 2 illustrates a block diagram of a DRAM 200, which may be utilized to implement various embodiments. In an embodiment, the memory 114 of FIG. 1 may include the DRAM 200. The DRAM 200 may include a plurality of memory banks (e.g., 16 banks are shown). The memory banks may have differing types of memory cells in some embodiments (e.g., where one type may be faster than others or may consume more or less power compared with other memory cell types). Moreover, various types of DRAM may be utilized for the memory banks shown in FIG. 2, including for example, Graphics DRAM, Fast DRAM, Low Power DRAM, etc. Also, each bank may have a different status, e.g., active or inactive (in sleep mode to conserve power when not in use, for example).

As shown in FIG. 2, the memory banks may be grouped into bank groups (e.g., four bank groups are shown). In the embodiment shown in FIG. 2, each bank group consists of four banks (e.g., banks 0-3, 4-7, 8-11, and 12-15). There may be a single shared read and write bus 202 (or more than one bus 202) in the core of the DRAM that is routed to all the bank groups. The bus 202 may communicate data and commands (such as a memory command; also referred to herein as a "memory request" or more generally a "request" as discussed herein with respect to FIGS. 3 and 4) to the various banks of the DRAM 200. As shown in FIG. 2, each memory bank may include a data path (e.g., for read/write data), a row latch and decode logic (e.g., to buffer and decode row related commands corresponding to rows such as the illustrated Word Line (WL) A), sense amplifiers (e.g., each including a pair of cross-connected inverters between the bit lines to balance stored charges), and a column decode logic (e.g., to decode column related commands).

In an embodiment, the memory controller 120 may issue read or write requests to the DRAM 200 in response to determination(s) made by the scheduler 125, e.g., to maximize bandwidth and/or reduce latency. Generally, a DRAM device may be addressed based on various types of information, such as per channel, rank, bank, row, column, etc. DRAMs may include four or more banks. DIMMs may include one or more ranks. The number of ranks on any DIMM refers to the number of independent sets of DRAMs that may be accessed for the full data bit-width of the DIMM (e.g., 64 bits). Generally, the ranks cannot be accessed simultaneously as they share the same data path or bus (e.g., bus 202).

Figure 3:
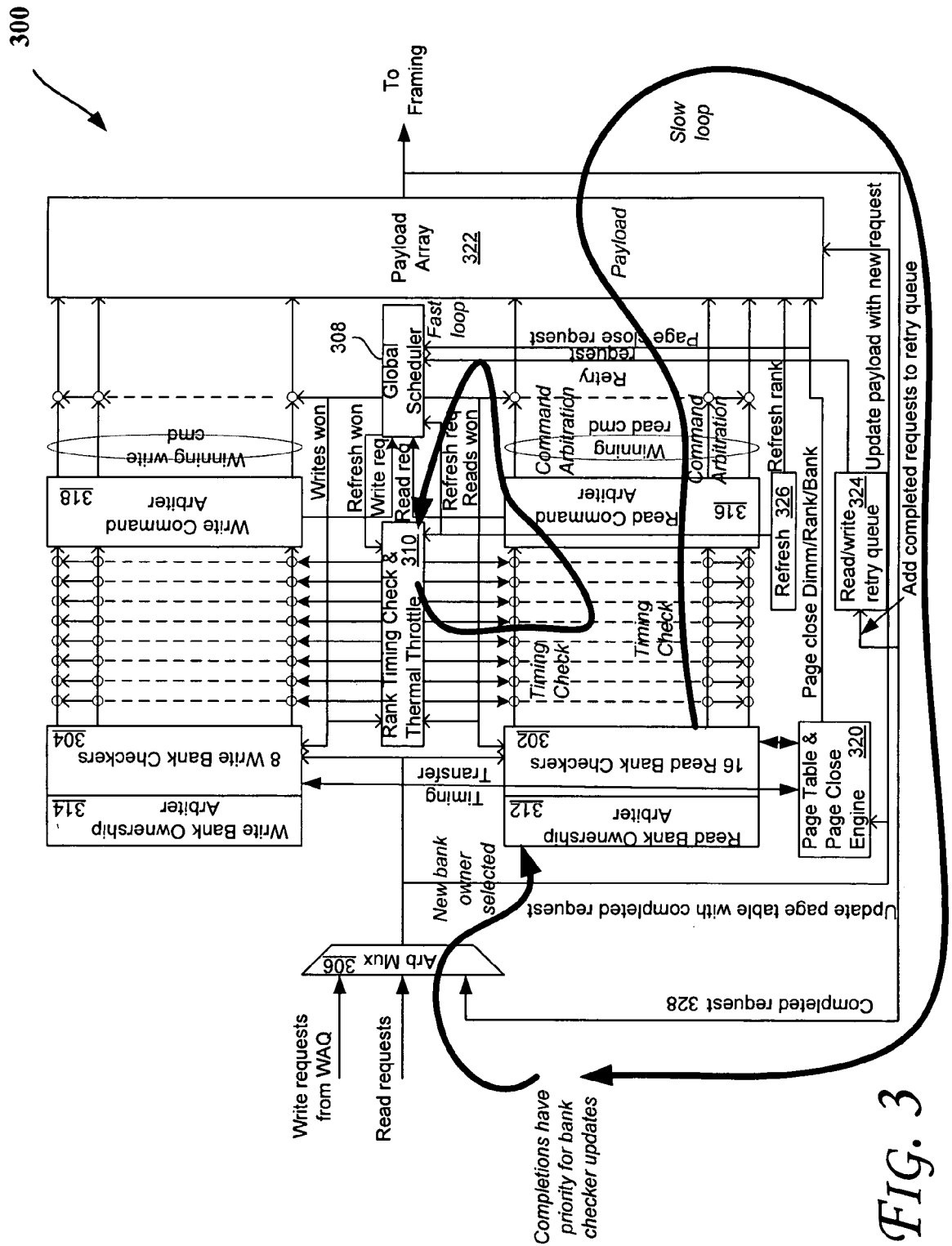
FIG. 3 illustrates a block diagram of a scheduler logic according to an embodiment.

FIG. 3 illustrates a block diagram of a scheduler logic 300, according to an embodiment. In one embodiment, the scheduler logic 300 may be the same or similar to the scheduler logic 125 discussed with reference to FIGS. 1-2 and 4-6. More particularly, logic 300 may include read bank checker(s) logic 302 (even though 16 are shown, and any number of read bank checkers may be used), write bank checker(s) logic 304 (even though 8 are shown, any number of write bank checkers may be used), arbitration multiplexer (Arb Mux) 306, global scheduler 308, rank timing logic 310, read bank ownership arbiter 312, write bank ownership arbiter 314, read command arbiter 316, write command arbiter 318, page table and page close engine 320, payload array 322, read/write retry queue 324, and refresh rank logic 326. In FIG. 3, the intersection of the arrow heads represents logic to check that every valid request from the bank checkers (read—302 or write—304) satisfies rank timing checks, e.g., using enable signals from rank timing logic 310.

The read bank checker(s) 302 may hold a read request directed to a particular memory bank (such as the banks discussed with reference to FIG. 2). For example, read bank checker(s) 302 may track or monitor memory (e.g., DDR3) bank timing parameters and ensures that these parameters are satisfied before attempting to schedule an associated read operation. The write bank checker(s) 304 may be similar to read bank checker(s) 304 but may instead hold write requests. Some bank timing parameters that are tracked include: tRCD (which refers to the time from ACT (Activate) command to internal read/write in the DRAM), tRAS (which refers to the period from ACT to Precharge (PRE) command), tRP (which refers to the PRE command period) and Read to Precharge timing for read bank checkers and Write to Precharge timing for write bank checkers.

In some embodiments, new requests and requests that are completed 328 (e.g., issued a CAS (Column Address Strobe) command) are fed into the scheduler 300 via the Arb Mux 306. Conflicts at the Arb Mux 306 cause new requests to back up into a staging queue (not shown). Also, the bank checkers may be fully associated, so they are not limited to a specific bank or rank.

As shown in FIG. 3, the global scheduler 308 arbitrates between read requests from read bank checkers 302 received through read command arbitrator 316, write requests from write back checkers 304 received through write command arbiter 318, refresh requests from refresh logic 326, page close requests from the page table and page close engine 320, completed requests from retry queue 324, etc.

Furthermore, rank timing logic 310 tracks or monitors (e.g., DDR3) rank level and/or DIMM level timing parameters. It ensures that these requirements are satisfied before allowing one or more requests from the bank checkers to be selected for issue to the DRAM. Generally, rank timing parameters tracked by logic 310 may include: tFAW (which refers to the four ACT window for a DRAM), tRRD (which refers to the ACT to next ACT command period for a DRAM), RD (Read) or WR (Write) CAS to next RD or WR CAS delay. In some embodiments, logic 310 may use thermal throttling techniques to determine whether to allow one or more requests from the bank checkers to be selected for issue to the DRAM, e.g., where logic 310 causes selection and/or delay in selection of bank checker for issue to the DRAM based on thermal sensor information. In various embodiments, one or more thermal sensors may be provided in the DRAM, scheduler, and/or elsewhere in components of FIGS. 1-3 and 5-6.

Moreover, a bank checker (e.g., checkers 302 or 304) is eligible to schedule a request if it is the owner of the corresponding DRAM bank. In an embodiment, there may only be one bank owner at a time for each DRAM bank. The bank owner may be aware of the latest page state of the DRAM page state and associated bank timing. As discussed above, a request that completes (e.g., issue a CAS command) is fed back to the scheduler 300 via the Arb Mux 306. This results in all valid bank checkers arbitrating for bank ownership. The function of the bank ownership arbiters (e.g., read/write bank ownership arbiters 312 and 314) is to select the best possible bank checker to become the new bank owner.

In an embodiment, the selected request is the request that is the oldest and/or highest priority request that is a page hit. In some embodiments, an age order matrix is used to track the age of each valid bank checker. If the bank ownership arbiter determines that there are no bank owners among the bank checkers, then the bank ownership and page state information is transferred to the page table 320.

The read and write command arbiters 316 and 318 arbitrate among the bank checkers to select the oldest and/or highest priority bank owner that has satisfied all bank and rank timing checks. For example, read command arbiter 316 may use an age order matrix (which stores age order of the read requests) with a priority mask (e.g., corresponding to one or more levels such as four priority masks including critical, high, medium and low—it is however possible to implement more masks that impose different selection criteria, e.g., in addition to age one may select page hits or command types (CAS over Precharges for instance)). Also, the write command arbiter 318 may use an age order matrix (which stores age order of the write requests). In an embodiment, write requests have no priority to distinguish them from each other.

Additionally, the page table 320 tracks or stores information about open DRAM page state and bank timing. As discussed above, logic 320 may also issue page close requests (e.g., per DIMM/rank/bank).

In some embodiments, the scheduler 300 attempts to issue a DRAM command (e.g., ACT (Activation), CAS, or PRE (Precharge)) every DRAM command clock (DCLK) cycle. In some embodiments, the number of activates to a DRAM may be determined in accordance with a rolling window, e.g., to limit or prevent activates. In one instance, a number of clock cycles before the next DCLK edge, the command selection arbiter pipeline shown in FIG. 3 selects the next command and passes to the payload array 322 (which is subsequently sent from the payload array to framing for issuance to the DRAM). This number of clock cycles is tunable but in one embodiment the minimum is three cycles to accommodate the depth of the selection pipeline. For example, a bank checker completes a request when a CAS command is issued. This completion information is fed back to the bank checkers via the Arb Mux 306 to transfer bank ownership to the next bank checker (e.g., by the ownership arbiters 312 or 314). The transfer of ownership may be a relatively slow pipe line as for example DDR3 protocol may allow a minimum of four DCLKS between requests to the same bank. However, the rank timing tracker is updated before the next DCLK (e.g., making a decision every DCLK), after a CAS command has been selected for issue. This is a fast pipe line (e.g., illustrated as the shorter loop in FIG. 3) and since only information about the type of command and the targeted rank are needed, this pipeline may be optimized in the design. For example, to improve performance, incoming new requests may take over or preempt a candidate from a bank checker that is already a bank owner. If the preemption is successful, then bank ownership is transferred to the new incoming request.

In some embodiments, preemption takes place if one or more of the following criteria is met:

(1) Read request that is a page hit may preempt read request that is a page miss. As discussed above, page state may be stored in the bank checkers and/or the page table.

(2) Read request may preempt a write request provided write requests are not backing up (e.g., based on a threshold value of available write request buffer space in one embodiment).

(3) Write requests may preempt read requests if writes are backing up (e.g., based on a threshold value of available write request buffer space in one embodiment).

(4) Write requests that are page hits may preempt write requests that are page misses if writes are backing up (e.g., based on a threshold value of available write request buffer space in one embodiment).

In an embodiment, the scheduler 300 operates independently of memory technology of the DRAM. This approach may allow for late changes to the DRAM memory technology used in a design. Also, the scheduler efficiently supports single DIMM per channel to multiple DIMMS per channel. In one embodiment, the scheduling is performed at the bank level, so scheduling is independent of the number of DIMMS. Further, in an embodiment, the scheduler may operate at a uniform clock frequency, while command scheduling may be aligned to the nearest DDR clock cycle so clock crossing logic is limited to the boundary between the memory controller and the memory controller pins.

Furthermore, as shown in FIG. 3 (e.g., by comparison of the fast loop (which corresponds to rank timing) and slow loop (which corresponds to bank timing)), the scheduler logic 300 may reduce the DRAM scheduler critical path (e.g., by elimination of command candidates constrained by timing due to the last command issued) allowing higher frequency operation.

Table 1 below illustrates information stored in bank checkers and payload array of FIG. 3 in accordance with an embodiment. Opcode refers to the opcode of the request. RAS opcode refers to Reliability, Availability, Serviceability opcode associated with the request (e.g., causing injection of memory scrubbing operations, where scrubbing generally refers to detection of correctable errors on read data, correcting the errors, and writing the corrected errors back to DRAM). Priority refers to relative priority of a given request compared to the priority of other request. In an embodiment, there may be four levels of priority (e.g., critical, high, medium, and low), however more or less priority levels may be used. Channel ID (Channel Identifier) refers to the identifier of the memory unit before the request is issued to the memory controller. Request ID identifies the agent ID for the entity that has made the request (e.g., a processor, an input/output device, etc.). DB Id refers to the data buffer identifier which stores the data associated with the request. WAQ Id refers to the identifier for a Write Address Queue (which may be internal to the memory controller in an embodiment) which corresponds to the write address queue that is to be allocated for storing data associated with a write request. Under Fill bit refers to a situation where a partial write is to occur followed by fetching of the whole memory line (e.g., indicating that there is more data for the read request). DIMM, Rank, Bank, Row, and Column refer to DRAM addressing information.

As can be seen by reference to Table 1, the payload array 322 holds all of the data that is received with a new request. The scheduler components however hold only a subset required to participate in the scheduling operations.

TABLE 1

| Request Type | Opcode | RAS Opcode | Priority | CH Id | DB Id | Req. Id | WAQ Id | Under Fill bit | DIMM/ Rank/ Bank/ Row | Col. |
|---|---|---|---|---|---|---|---|---|---|---|
| Read Info stored in Read Bank Checker | | | x | x | | x | | x | x | |

TABLE 1-continued

| Request Type | Opcode | RAS Opcode | Priority | CH Id | DB Id | Req. Id | WAQ Id | Under Fill bit | DIMM/ Rank/ Bank/ Row | Col. |
|---|---|---|---|---|---|---|---|---|---|---|
| Write Info stored in Write Bank Checker | | | | | | | x | | x | |
| Info stored in Payload Array | x | x | x | x | x | x | x | x | x | x |

Figure 4:
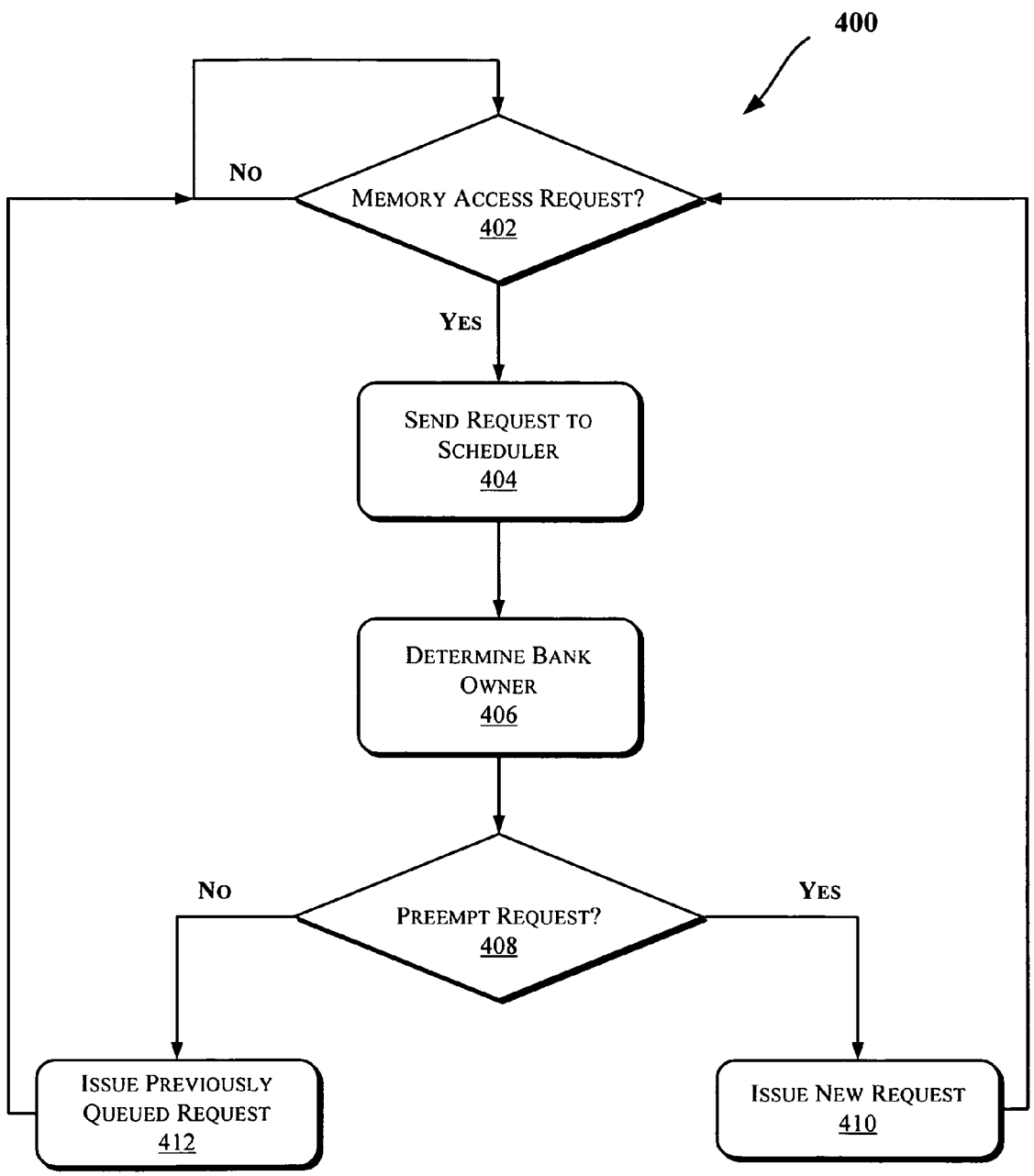
FIG. 4 illustrates a flow diagram of a method in accordance with an embodiment of the invention.

FIG. 4 illustrates a flow diagram of an embodiment of a method 400 to schedule a memory request, in accordance with an embodiment of the invention. In an embodiment, various components discussed with reference to FIGS. 1-3 and 5-6 may be utilized to perform one or more of the operations discussed with reference to FIG. 4. For example, the method 400 may be used to issue read or write requests to a memory device, such as the DRAM of FIG. 2 or memory 114 of FIG. 1.

Referring to FIGS. 1-4, at an operation 402, it may be determined (e.g., by a memory controller such as those discussed herein) whether a memory access request is received. The memory access request may include a write or read command. The received request may be passed to a scheduler (e.g., scheduler logic 300) at an operation 404. At an operation 406, the next memory bank owner may be determined (e.g., by the scheduler logic 300 such as discussed with reference to FIG. 3). At operation 408 if the request is to be preempted, a new request (e.g., a newly received request) may preempt the previously queued request at operation 410 (e.g., by the scheduler logic 300 such as discussed with reference to FIG. 3). Otherwise, the previously queued request next inline may be issued at operation 412 (e.g., by the scheduler logic 300 such as discussed with reference to FIG. 3). As shown in FIG. 4, after operations 410 and 412, the method 400 may resume at operation 402.

Figure 5:
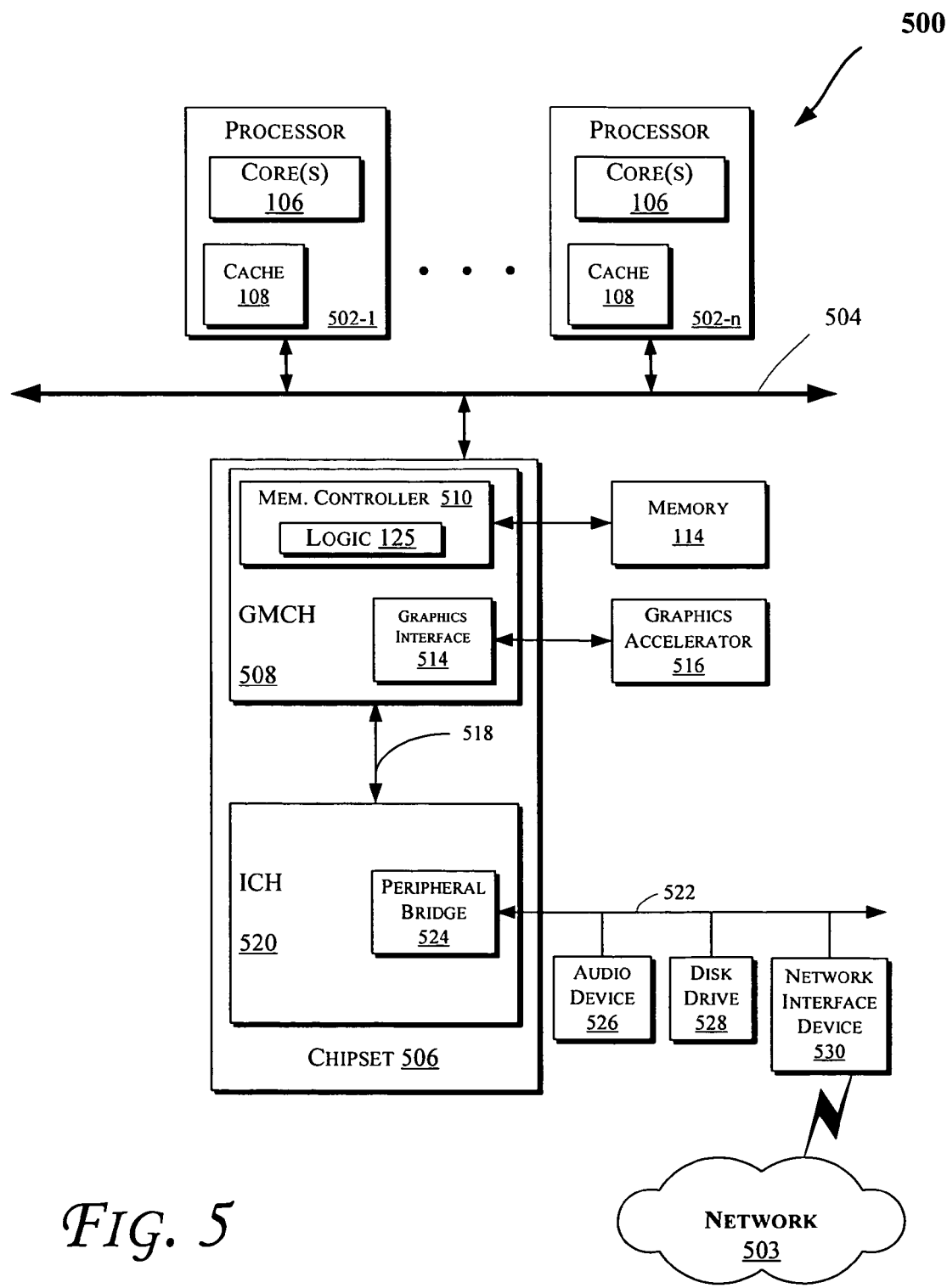

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-5 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment, e.g., including the scheduler logic 125) that communicates with the memory 114. The memory 114 may store data, including sequences of instructions that are executed by the CPU 502, or any other device included in the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
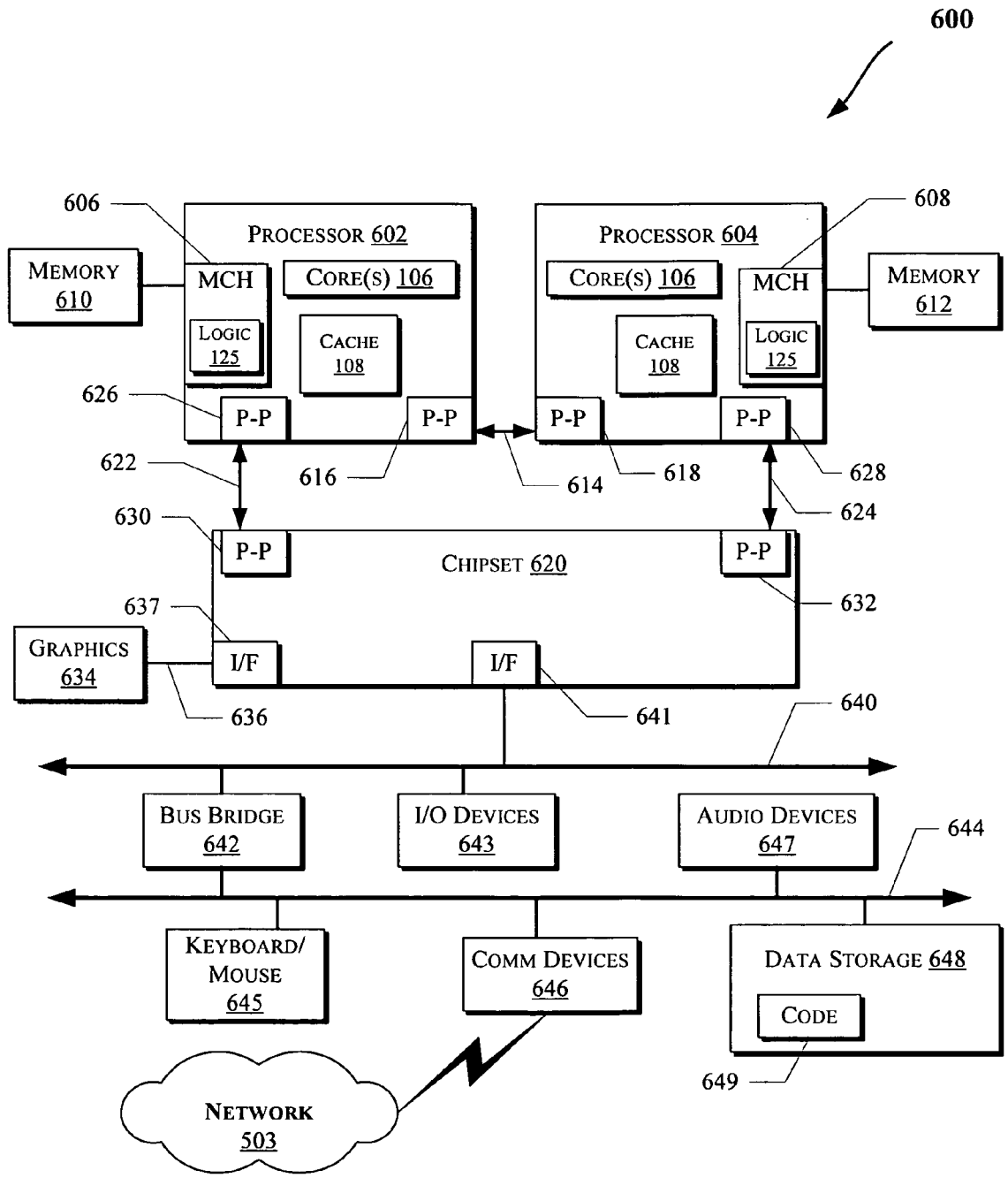

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 and/or logic 125 of FIG. 1 in some embodiments.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

As shown in FIG. 6, one or more of the cores 106 and/or cache 108 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 643 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A memory scheduler comprising:
   first logic to:
      monitor a first timing parameter of one or more memory bank timing parameters corresponding to a memory bank that includes a portion of a memory device; and
      result in a memory request to become a candidate for scheduling to the portion of the memory device in response to satisfaction of the first timing parameter; and
   second logic to:
      monitor a second timing parameter of one or more memory rank timing parameters corresponding to a rank of the portion in the memory device, wherein each memory rank of the memory device is to correspond to a set of a plurality of memory cells that are capable of being accessed at a full data bit bandwidth of the memory device; and
      result in scheduling of the memory request from the first logic to the portion of the memory device in response to satisfaction of the second timing parameter,
   wherein the memory request is to be preempted by a different memory request based on a determination of whether the memory request is a read request that is a page hit and the different memory request is a read request that is a page miss.

2. The memory scheduler of claim 1, wherein the first logic is to result in a memory request to become a candidate for scheduling a select number of clock cycles prior to the second logic causing scheduling of the memory request, wherein the clock cycles correspond to a command clock cycle of the memory device.

3. The memory scheduler of claim 2, wherein the number of clock cycles is 3.

4. The memory scheduler of claim 1, wherein the first and second logic are to result in issuance of a Dynamic Random Access Memory (DRAM) command for every DRAM command clock (DCLK) cycle.

5. The memory scheduler of claim 1, wherein the second logic is to result in scheduling of the memory request from the first logic to the portion of the memory device in response to a determination that the first logic is an owner of the portion of the memory device.

6. The memory scheduler of claim 1, further comprising a third logic to determine whether the memory request is one or more of: an oldest request that is a page hit or a highest priority request that is a page hit.

7. The memory scheduler of claim 1, further comprising a page table to store information about open memory page state and bank timing corresponding to the memory device.

8. The memory scheduler of claim 7, further comprising logic to issue page close request based on information stored in the page table.

9. The memory scheduler of claim 1, further comprising one or more thermal sensors, wherein the second logic is to result in scheduling of the memory request from the first logic to the portion of the memory device in response to a determination based on the one or more thermal sensors.

10. The memory scheduler of claim 1, wherein the second logic is to monitor a timing parameters corresponding to a Dual In-line Memory Module (DIMM) level of the portion of the memory device.

11. The memory scheduler of claim 1, further comprising a third logic to arbitrate between the memory request from the first logic, a refresh request from a refresh logic, a page close request from a page table, or a completed request from retry queue.

12. The memory scheduler of claim 1, wherein the first logic is fully associated.

13. The memory scheduler of claim 1, wherein the memory device comprises a DRAM device and the portion of the memory device comprises one or more banks of the memory device.

14. The scheduler of claim 1, wherein the memory request is to be preempted by the different memory request based on a determination of whether the memory request is a write request that is a page hit and the different memory request is a write request that is a page miss.

15. The scheduler of claim 1, wherein the memory request is to be preempted by the different memory request based on a determination of whether the memory request is a read request, the different memory request is a write request, and one or more write requests are backing up in a write request buffer.

16. The scheduler of claim 1, wherein the memory request is to be preempted by the different memory request based on a determination of whether the memory request is a write request, the different memory request is a read request, and one or more write requests are backing up in a write request buffer.

17. A system comprising:
a memory device having a plurality of memory cells;
a processor to access the memory device; and
a memory controller comprising a scheduler, the scheduler comprising:
first logic to:
monitor a first timing parameter of one or more memory bank timing parameters corresponding to a memory bank that includes a portion of the memory device; and
result in a memory request to become a candidate for scheduling to the portion of the memory device in response to satisfaction of the first timing parameter; and
second logic to:
monitor a second timing parameter of one or more memory rank timing parameters corresponding to a rank of the portion in the memory device, wherein each memory rank of the memory device is to correspond to a set of the plurality of memory cells that are capable of being accessed at a full data bit bandwidth of the memory device; and
result in scheduling of the memory request from the first logic to the portion of the memory device in response to satisfaction of the second timing parameter,
wherein the scheduler of the memory controller is to operate in accordance with a clock that is independent of a clock used for storage components of the memory device.

18. The system of claim 17, wherein the memory device comprises a Dynamic Random Access Memory (DRAM).

19. The system of claim 17, wherein the portion of the memory device comprises one or more banks of the DRAM.

20. The system of claim 17, further comprising an audio device.

* * * * *